Figure 1:
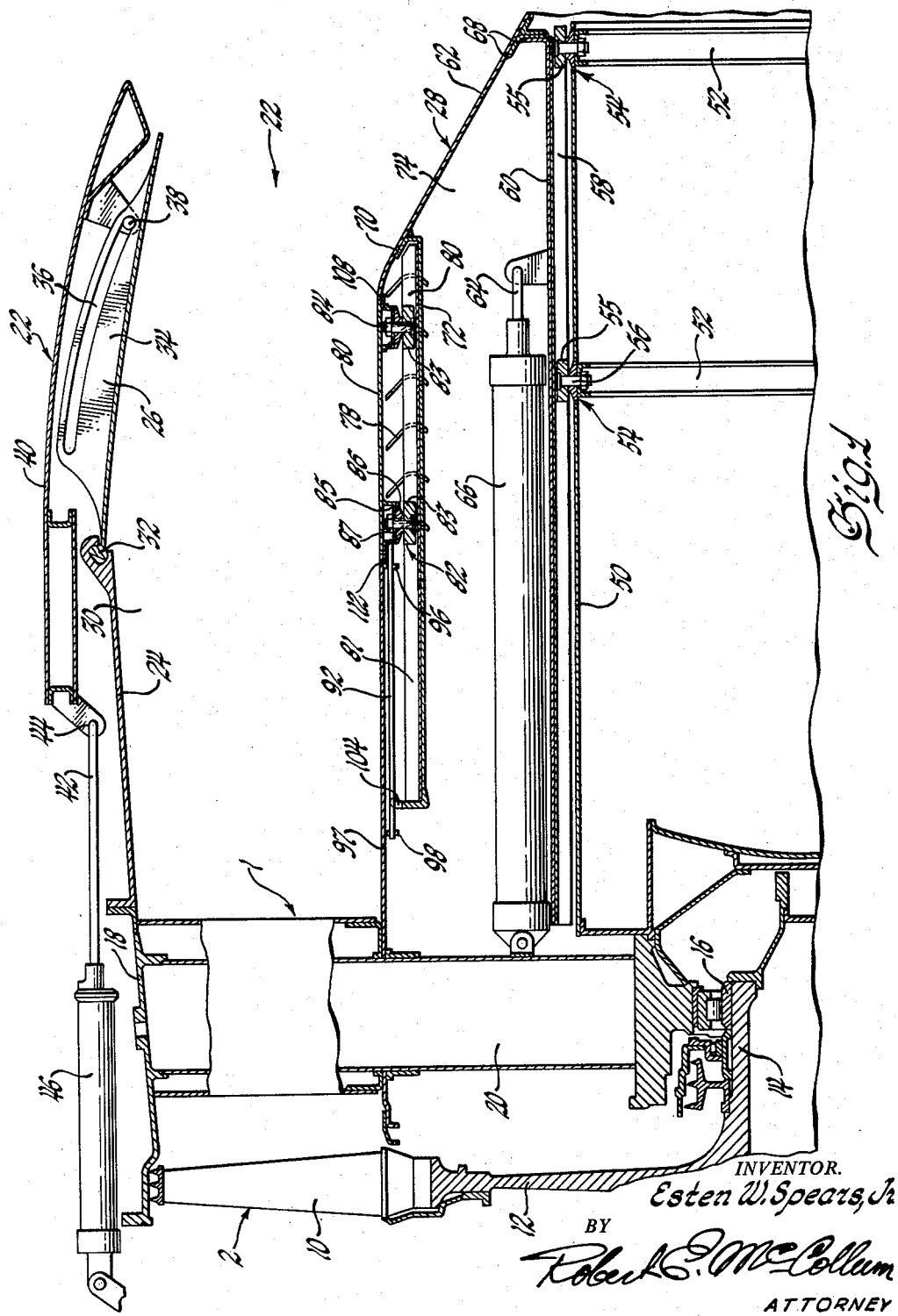

INVENTOR.
Esten W. Spears, Jr.
BY Robert E. McCollum
ATTORNEY

United States Patent Office 3,153,321
Patented Oct. 20, 1964

3,153,321
THRUST REVERSING MECHANISM
Esten W. Spears, Jr., Indianapolis, Ind., assignor to General Motors Corporation, Detroit, Mich., a corporation of Delaware
Filed Nov. 28, 1958, Ser. No. 776,927
5 Claims. (Cl. 60—35.54)

This invention relates to a thrust reversing mechanism.

More specifically, this invention relates to a thrust reverser for a gas turbine engine having a plug-type variable exhaust nozzle, the thrust reverser providing a reverse thrust or braking action to an aircraft during landing thereof.

Therefore, it is an object of this invention to provide thrust reversing means in cooperation with the exhaust nozzle of a gas turbine engine furnishing means for braking the forward motion of the aircraft during landing thereof.

This invention provides the thrust reversing or negative thrust described by providing the engine with an exhaust cone consisting of a number of annular members telescopically and slidably mounted with respect to each other and together defining a gas chamber. When in telescoped position, the members provide a substantially continuous streamlined surface to guide the exhaust gases from the turbine outlet into the exhaust nozzle to be discharged into the air stream with the least amount of resistance. Upon extension of the telescopic members relative to each other, gas blockage flaps are extended into position across the passage blocking the same, and gas inlets and outlets are uncovered causing the gases to pass through gas flow direction reversing vanes into the air stream in a direction opposite to the normal direction of flow through the passage.

Therefore, it will be seen that this invention has for its object to provide a plug cone having a sliding tubular gas compartment with inlets and outlets for by-passing the gases in the exhaust passage past the variable nozzle blockage flaps, redirecting the flow of gas in a direction to oppose forward movement of the aircraft.

Other features, advantages and objects will become apparent by reference to the detailed description of the invention and to the drawings wherein there is shown the preferred embodiments of this invention.

Figure 2:
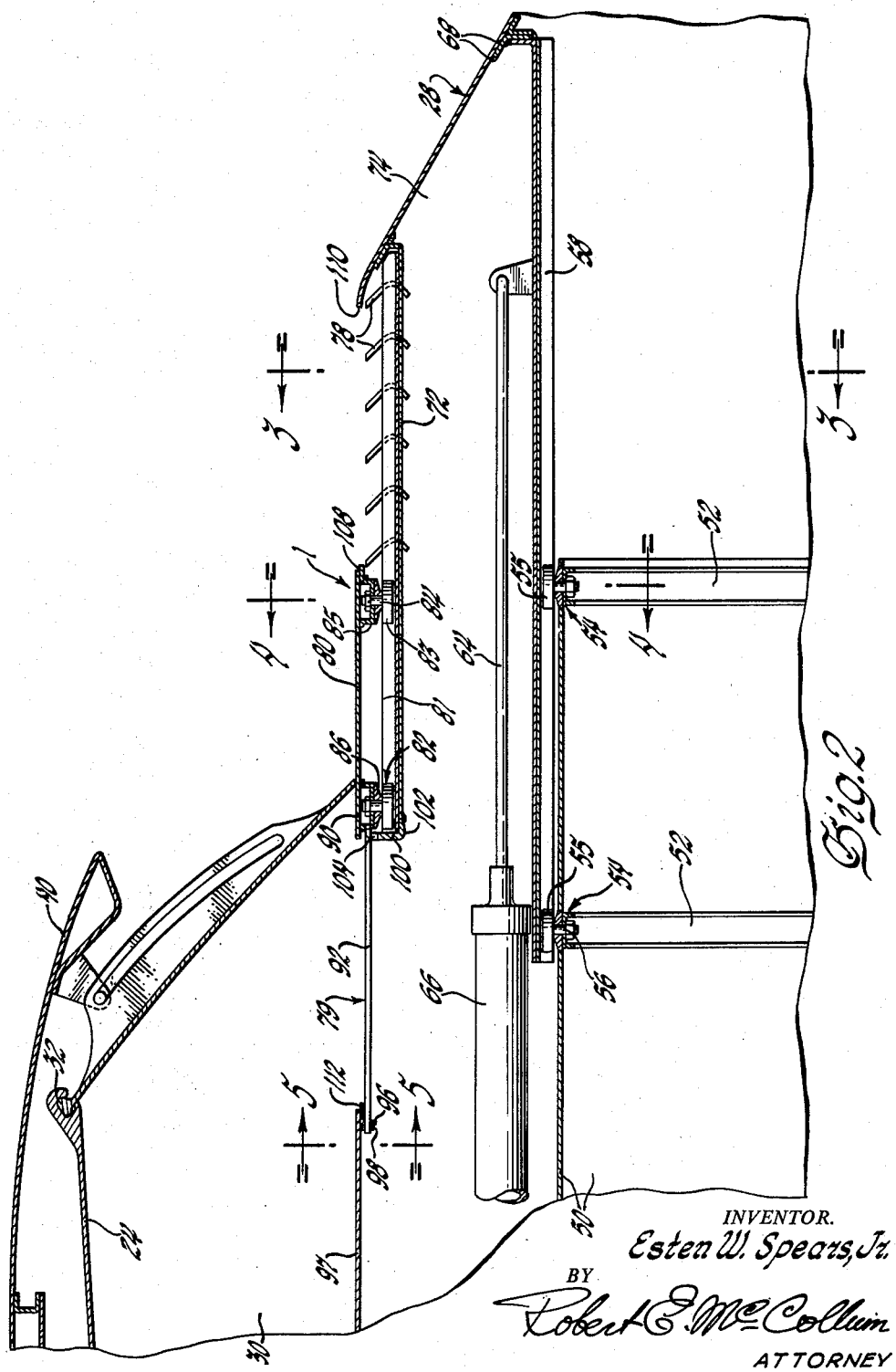
Figure 3:
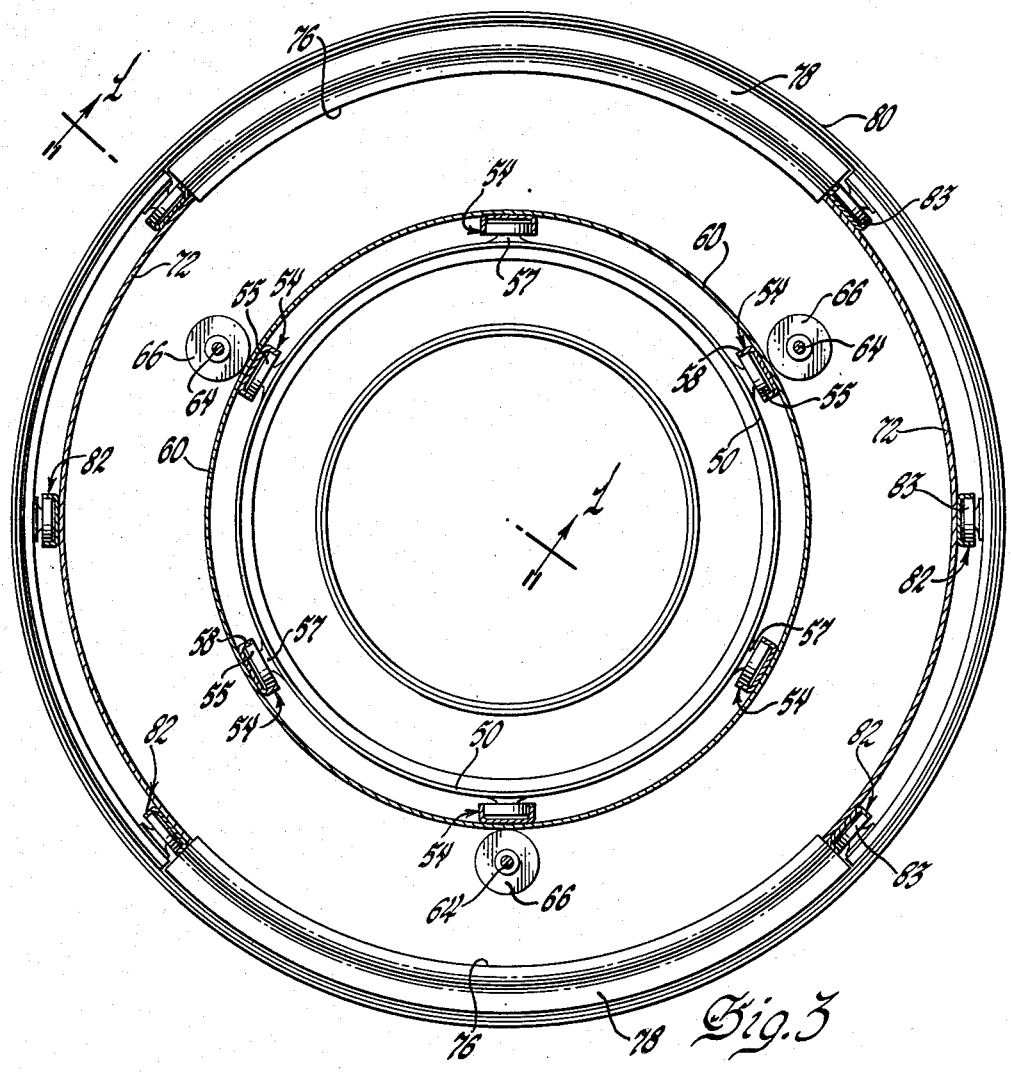
Figure 4:
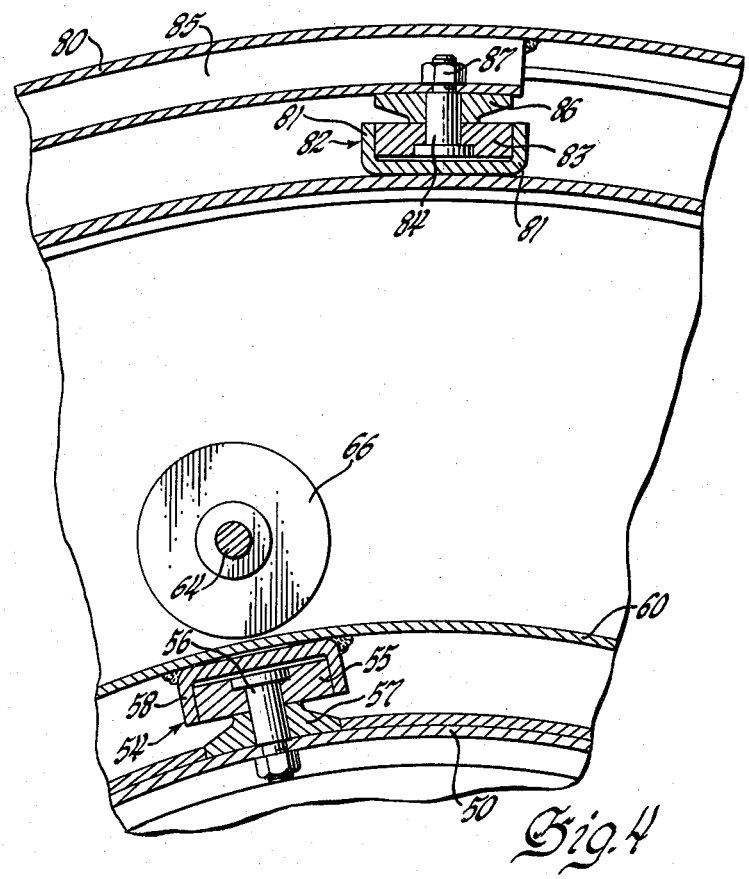
Figure 5:
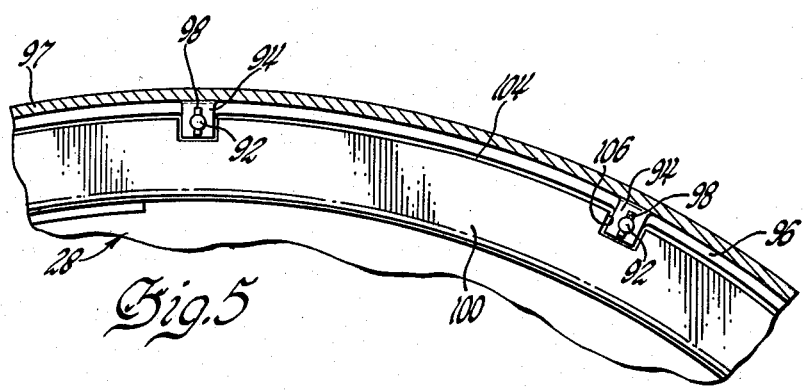

In the drawings:

FIGURE 1 is a cross-sectional view of a portion of a gas turbine engine illustrating the thrust reversing mechanism in its closed or inoperative position, FIGURE 2 is a cross-sectional view of a portion of the thrust reversing mechanism of FIGURE 1 in its open or operative position, FIGURE 3 is a cross-sectional view of details in a plane indicated by the lines 3—3 of FIGURE 2, FIGURE 4 is an enlarged cross-sectional view of details in a plane indicated by the lines 4—4 of FIGURE 2, and FIGURE 5 is an enlarged cross-sectional view of a detail in the plane indicated by the lines 5—5 of FIGURE 2.

Referring to the drawings and more particularly to FIGURE 1, there is illustrated therein the downstream or aft portion 1 of a gas turbine engine including the final stage of the rotor assembly 2 of an axial flow turbine. The rotor assembly 2 includes a plurality of circumferentially spaced turbine blades 10 secured to a turbine wheel or disk 12 for rotation thereof, the turbine wheel being formed integral with a sleeve shaft 14 supported for rotation upon a bearing means 16 in turn supported from the engine casing 18 by a plurality of circumferentially spaced strut means 20 (only one shown). The details of the gas turbine engine further upstream of the portion already described are known and are immaterial to an understanding of the present invention and therefore will not be described. Suffice it to say, however, that the engine has compressor and combustion sections delivering motive fluid to the turbine sections to drive the blades therein, which in turn drive the main drive shaft through sleeve shaft 14.

Cooperating with the last stage of the turbine section is an exhaust nozzle 22 defined in part by an annular extension 24 of the engine casing having a number of circumferentially arranged movable nozzle flaps 26 pivoted thereto, the flaps overlapping each other slightly in a circumferential direction to provide an adjustable closure. The other portion of the nozzle comprises an annular multi-membered movable inner body or plug cone 28 located on the axis of the engine and together with the casing 24 and flaps 26 defining an annular gas passage 30. It is the construction of this plug cone or inner body 28 and the movement of the same together with the movement of the flaps 26 to control the path of the exhaust gases to provide a thrust reversing action to the aircraft with which this invention is concerned.

As shown in FIGURE 1, each of the flaps 26 is pivoted at 32 to the engine casing 24 and is provided with a cam plate 34 having a cam slot 36 slidably engageable with a pin 38 secured to an annular casing or shroud 40. The shroud 40 is movable axially to move the flaps 26 radially by means of piston rods 42 connected to the shroud at 44 and reciprocable with pistons (not shown) within cylinders 46 supported upon the engine casing by any suitable means (not shown). The actuation of the cylinders 46 is maintained in timed relationship to the actuation of the inner body or plug cone, as will be described later. The operation of the variable exhaust nozzle flaps 26 will be clear by reference to FIGURE 1, i.e., axial movement of the piston rods 42 towards the left as seen in FIGURE 1 causes axial movement of the shroud 40 and pins 38 to cam the flaps 26 radially inwardly until the downstream edge of the flaps abuts the inner body or plug cone wall as seen in FIGURE 2.

Referring now to the construction of the inner body or plug cone 28, an annular or cylindrical cone supporting frame 50 is fixed to the rear turbine bearing support struts 20 and extends downstream therefrom as seen in FIGURE 1, where it is reinforced by annular channel-shaped members 52 to provide greater rigidity thereto. Secured to each of the reinforcing members and cylindrical member are six roller assemblies 54 equally spaced around member 50 as shown in FIGURES 3 and 4, each comprising a roller 55 rotatably mounted on a pin 56 inserted through openings in member 50 and a spacer support 57 and secured thereto. Slidably mounted on each of the rollers 55 of these assemblies is a channel or track 58 welded or otherwise secured to an inner annular wall member 60 supporting the aft portion 62 of the inner body or cone plug for an axial sliding movement of the plug cone relative to member 50, annular member 60 being slidable axially on the rollers 55 by the hydraulic actuation thereof by piston rods 64 connected thereto and movable within cylinders 66, three of which are shown, although any number could be used as a matter of choice without departing from the scope of the invention. The conically-shaped aft portion 62 of the inner body or plug cone 28 is welded to member 60 at 68, and in turn has welded thereto at 70 a second cylindrical member 72 extending upstream and together with cylindrical member 50 defining a gas compartment 74 for a purpose to be described.

As shown in FIGURES 2 and 3, member 72 at diametrically opposite vertical points has 90° arcuate openings 76 within which are fixed cascades of six arcuate turning vanes 78 shaped to reverse the direction of the exhaust gas flow as much as possible from the normal direction of flow through passage 30 to provide maximum thrust reversal without actually contacting any parts of the engine by the extremely hot gases. The vane inlets receive the gas from compartment 74, and the outlets are positioned so as to discharge the gas into the air stream in a direction of say, for example, 120° from the normal rearward direction of flow. Cooperating with the cascade of vanes 78 and member 72 is an annular cover plate 80 axially slidable relative to member 72 and the stationary structure of the nozzle so as to both uncover vanes 78 and provide an inlet 79 into chamber 74 for the gases upon blockage of passage 30 and movement of the plug cone into thrust reversing position, and also to provide a cover for the vanes 78 when the cone is in the FIGURE 1 position, preventing the flow of gas into and out of the chamber 74.

Referring now to the details of slidably supporting this cover plate 80 on member 72, fixed to the outer radial surface of member 72 within 90° arcuate segments between the two cascades of turning vanes are six axially extending channel-shaped roller tracks 81, three to a segment as shown, slidably and rollingly supporting therein two axially spaced sets of six roller assemblies 82, each assembly having a roller 83 rotatably mounted on a pin 84 inserted through openings in a channel 85 and a spacer 86 and threadedly secured to the channel by a nut 87, the channel in turn being welded or otherwise secured to the cover plate 80. Because of the inaccessibility of the nuts, the nuts may be welded to channel 85 in the appropriate locations prior to insertion of the pins 84 therein, the channel then being welded to cover plate 80 and the rollers, pins and spacers threadedly inserted in the nuts thereafter. Plate 80 has a diameter slightly greater than the diameter of the exit portion of the turning vanes, and an axial length as shown in FIGURE 1 such that with the thrust reversing mechanism in inoperative position, as described, the cascades of turning vanes are covered. The annular cover plate 80 is thus slidable axially on the rollers in the tracks 81. Welded or otherwise secured to the channel 85 at each of the six roller bearing assembly locations adjacent the upstream edge 90 of cover plate 80 is a rod 92 as shown in FIGURES 1, 2 and 5, extending upstream and being slidably supported in a depending apertured flange 94 of an annular stop plate 96 secured to a tubular supporting ring 97 fastened to and supported by the rear turbine bearing support struct 20. A cross pin 98 or other suitable means is fixed in the end of each rod to abut the flange 94 and therefore limit the downstream axial movement of cover plate 80. The cylindrical roller track supporting member 72 likewise has a radially extending ring 100 with an axially extending flange 102 and a bent abutting surface 104, the ring being secured along flange 102 by welding to one end of member 72, with surface 104 being in a position to abut or be abutted by the channel 85 at the upstream edge 90 of cover plate 80. Referring to FIGURE 5, ring 100 is notched as shown at 106 in line with each of the rods 92 and flanges 94 so the ring 100 can slide past the flanges to position the turning vanes in inoperative position as will be described.

As also shown in FIGURES 1 and 2, the downstream edge of cover plate 80 has an annular flange 108 secured thereto to form a step portion facilitating the axial alignment of the cover plate and edge 110 of aft portion 62 of the plug cone when in the FIGURE 1 position. The plate 96 also is flanged axially at 112 to provide a similar axially aligning step portion cooperating with the edge 90 of cover plate 80.

Therefore, it will be seen that the structure defining chamber 74 is slidably and telescopically mounted on the member 50, and supports the cover plate 80 slidably thereon. The space between the rods 92 forms an inlet 79 for the exhaust gases when the blockage flaps 26 are across passage 30 and the plug cone is extended, and the gases entering therein are forced to flow out into the air stream past the turning vanes 78.

The operation of this thrust reversing mechanism is therefore as follows: With the thrust reversing mechanism in its inoperative position as indicated in FIGURE 1, the exhaust passage 30 is unrestricted and the normal forward thrust requirements of the engine are satisfied by the free flow of exhaust gases through the passage 30, the aft portion 62 of plug cone section 28 abutting the cover plate 80 in turn abutting the support member 97 to form a continuous conically shaped plug cone presenting a streamline path or fairing for the flow of exhaust gases therepast. As shown, the cascades of turning vanes 78 are telescoped into position under the cover plate 80 and therefore out of communication with the exhaust gases.

When it is desired to initiate thrust reversing, fluid under pressure is supplied simultaneously to cylinders 46 and 66 through suitable conduits (not shown) to simultaneously actuate the piston rods 42 and 64. Taking each separately, leftward axial movement of the piston rods 42 moves cam pins 38 and shroud 40 axially to the left as seen in FIGURE 1 to radially move the flap segments 26 about the pivots 32 until the downstream edges abut cover plate 80, blocking the exhaust of gases through the passage 30. Simultaneously, piston rods 64 are moved axially to the right as seen in FIGURE 1, moving the aft portion 62 of the plug cone and the cascade of vanes 78 to the right until the ring 100 and bent surface 104 abut channel 85 on the upstream edge 90 of the cover plate 80. Further movement of the plug cone portion 62 to the right carries the cover plate 80 to the right until further movement of rods 92 is prevented by the abutment of pins 98 against the plates 94. At this time, the parts are in the position shown in FIGURE 2 with the exhaust passage 30 closed by the blockage flaps, the space between cylindrical support 97 and the cover plate 80 providing an opening 79 for the entry of exhaust gases into the annular gas compartment 74 from which the gases are discharged through turning vanes 78 into the air stream aft of the blockage flaps in a direction nearly reverse to the normal direction of gas flow through the passage 30. Thus, the forward motion of the aircraft is resisted by the discharge of the exhaust gases in the same direction. As will be noted from FIGURE 3, the cascade of turning vanes is located such that the gas is discharged only in a vertical or radial direction so as not to interfere with the proper flow of air past the wings of the aircraft, which would be the type of discharge in the case of an engine installed directly on the wing. It will be clear, however, that the cascades of turning vanes could be provided in other segments of the annular chamber depending upon the particular installation with respect to the wing so as to discharge the gas radially or axially without departing from the scope of the invention.

The return of the thrust reversing mechanism to its inoperative position as shown in FIGURE 1 is accomplished by actuation of the cylinders 46 and 66 to simultaneously move the piston rods 42 and 64 to the right and left, respectively, moving the blockage flaps 26 radially outwardly about the pivots 32 to the position shown, sliding the cylindrical support 60, aft portion 62 of plug cone 28, and the cascade of turning vanes 78 leftwardly until edge 110 abuts edge 108 of cover plate 80, and moving the cover plate 80 leftwardly until edge 90 abuts and overlaps flange 112 of support 97. The rods 92 and ring 100 meanwhile have moved leftwardly to be telescopically received within the annular support 97, and the parts will again be in the position indicated in FIGURE 1.

From the foregoing it will be seen that this invention has provided a simple and efficient thrust reversing mechanism for producing a negative thrust to aid in braking the forward motion of the aircraft. The provision of a telescopically mounted gas compartment within the plug cone provides for a minimum amount of projecting parts thereby providing minimum interference with the efficient operation of the engine.

While the invention has been illustrated in its preferred embodiment, it will be clear to those skilled in the art that many modifications can be made thereto without departing from the scope of the invention.

I claim:

1. An inner body construction for an exhaust nozzle comprising an annular support, a hollow tubular closed end member axially aligned with said support and mounted thereon for a slideable axial movement relative thereto to a plurality of positions, said member having radially spaced inner and outer walls together with said support and closed end defining a gas chamber, said member having openings in the outer wall thereof, a plurality of exhaust gas guide vanes secured to said outer wall within said openings, a substantially annular cover plate mounted on said outer wall for a sliding movement relative thereto to a plurality of positions, said member in one position defining an inlet opening between the outer wall and said support for the passage of gas into said chamber and out through said openings past said vanes, said plate in one position covering said openings, vanes, and inlet opening while in another position uncovering said inlet and openings and vanes, and means on said member to actuate said plate to its plurality of positions said means moving said plate to its said one position upon movement of said member to its said one position.

2. An inner body construction for an exhaust nozzle comprising an annular support, a hollow tubular closed end member axially aligned with said support and mounted thereon for a slideable axial movement relative thereto to a plurality of positions, said member having radially spaced inner and outer walls together with said support and closed end defining a gas chamber, said member having openings in the outer wall thereof, a plurality of exhaust gas guide vanes secured to said outer wall within said openings, a substantially annular cover plate mounted on said outer wall for a sliding movement relative thereto to a plurality of positions, said member in one position defining an inlet opening between the outer wall and said support for the passage of gas into said chamber and out through said openings past said vanes, said plate in one position covering said openings, vanes, and inlet opening, and in another position uncovering said inlet and openings and vanes, and means on said member to actuate said plate to its plurality of positions upon movement of said member to its plurality of positions.

3. An inner body as in claim 2 wherein a plurality of roller assemblies are provided supporting said member and cover plate for sliding movements relative to said support and member, respectively, said assemblies being secured respectively to said support and plate.

4. An inner body as in claim 3 wherein said inner and outer walls of said member have roller track elements secured thereto, said roller assemblies each having rollers rotatably secured thereto and engageable with said tracks to permit sliding movement of said member and cover plate.

5. A jet propulsion nozzle comprising, in combination, an outer casing, an inner body mounted within the casing, the casing and body defining between them an annular duct for fluid terminating in an outlet, a ring of flaps hinged at the outlet end of the casing movable to a closed position at least nearly in contact with the inner body to obstruct the said outlet, the inner body including a plug mounted for movement axially of the outlet, the plug including a portion defining a reverse thrust outlet movable from a first position generally abreast of the flaps to a second position downstream of the flaps in their closed position, means defining an inlet into the inner body upstream of the flaps in their closed position, and means operative to close the said inlet and reverse thrust outlet when the outlet is in the first position and open the said inlet and reverse thrust outlet when the outlet is in the second position, the last-mentioned means including the rearward part of the inner body and an annular shield reciprocable on the plug and reciprocable relative to the inner body, the said inlet being within the inner body when the outlet is in the first position and the said shield being disposed between the inlet and reverse thrust outlet when the outlet is in the second position.

References Cited in the file of this patent

UNITED STATES PATENTS

| | | |
|---|---|---|
| 2,620,623 | Imbert | Dec. 9, 1952 |
| 2,794,317 | Brown | June 4, 1957 |
| 2,803,944 | Kroon | Aug. 27, 1957 |
| 2,838,909 | Meulien | June 17, 1958 |
| 2,874,538 | Laucher et al. | Feb. 24, 1959 |
| 2,886,946 | Parker | May 19, 1959 |